July 7, 1942.  E. L. POWELL  2,288,642
AUTOMATIC BLEEDER VALVE
Filed Dec. 17, 1940
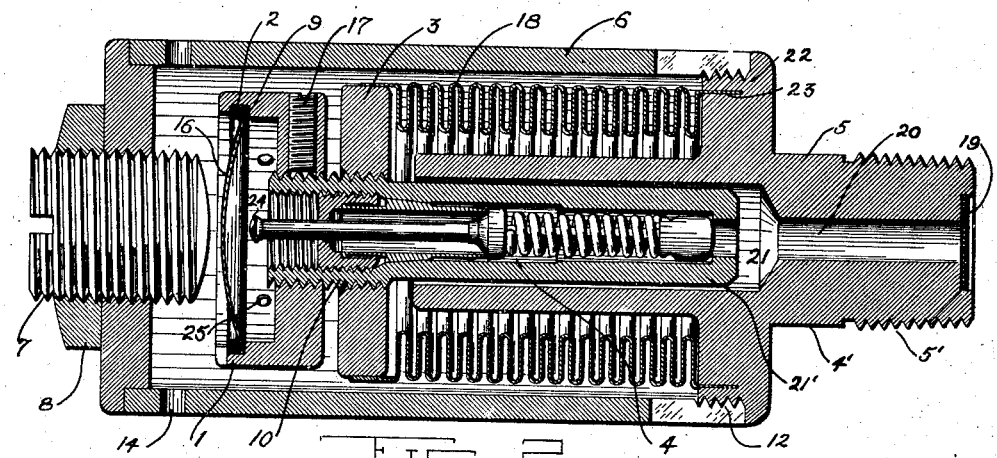
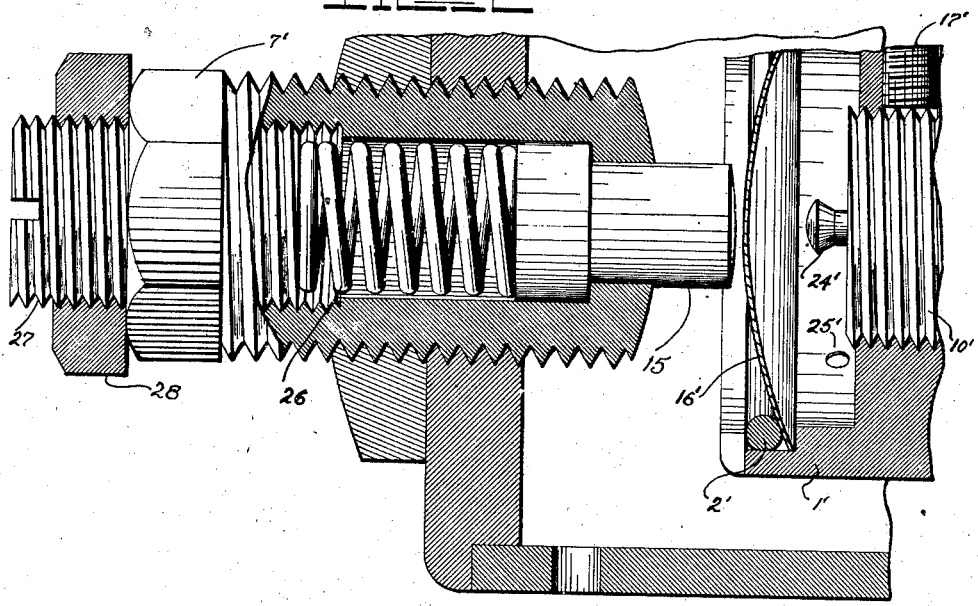
INVENTOR
Edwin L. Powell
BY
ATTORNEY Patented July 7, 1942

2,288,642

UNITED STATES PATENT OFFICE 2,288,642

AUTOMATIC BLEEDER VALVE

Edwin L. Powell, Washington, D. C.

Application December 17, 1940, Serial No. 370,512

24 Claims. (Cl. 137—53)

(Granted under the act of March 3, 1883, as amended April 30, 1928; 370 O. G. 757)

This invention relates to "pop off" or pressure relief valves for use with normally closed systems, wherein it is desired to maintain the internal gases or fluid contents between defined desired maximum and minimum limits of pressure. More particularly, this invention applies to normally static, low pressure systems, such as in the operating range of from 0 to 50 pounds per square inch, wherein it is essential that a hermetic seal be automatically attained at the desired minimum pressure limit. As an example of a precise application, the automatic bleeder valve described herein may be installed at the remote end of a high frequency coaxial transmission line, such as at the top of a radio antenna structure, the line being charged with nitrogen gas at low pressure to prevent moisture intrusion. Thus, by injecting nitrogen at the station or control end of the line at a pressure in excess of the maximum desired limit, the valve will open and can be so maintained for scavenging purposes. Upon removal of the charging pressure at the source, the valve will provide a hermetic seal when the pressure in the line falls to a desired minimum limit. If the frictional losses are such that the rate of flow in the line is less than the rate of discharge at the valve, the unit will automatically open and close until the pressure is equalized throughout the length of the line at some value between the maximum and minimum operating limits to which the valve has been adjusted.

In the previous known state of the art, valves similar to my construction, presently to be described, have been proposed for use in filling or testing pneumatic tubes for vehicles or the like. U. S. Patents Nos. 1,481,551 and 1,869,051, illustrate the type of valve to which I have particular reference. The operation of these valves is not, however, satisfactory for the purpose proposed above and my construction consists primarily in improvements in the operating and adjusting characteristics of such devices disclosed in the prior art. Similarly, the well known automatic, quick acting, diaphragm relief valves are unsatisfactory for my specific purpose because in this type of valve the pressure is applied directly to the valve disc (or the diaphragm to which the closure member is attached) in a direction tending to open the valve, and therefore these valves are not capable of being adjusted within precise limits; they have a wide differential characteristic, and by reason of their slow seating action, do not provide a complete positive seal. These characteristics are particularly true for operation in the lower pressure range.

In the constructive details of my invention the pressure is applied directly to the valve disc in a direction tending to close rather than open the orifice. Entirely separate quick acting means are employed to independently depress and release the valve plunger at the desired maximum and minimum pressure limits. This quick acting means also has incorporated therein a delayed action whereby no movement of the valve plunger will result at intermediate values of applied pressure, a marked improvement in the operating characteristics of prior devices. Thus, in my device the complete opening and closing of the valve proper is effected instantaneously through reverse "trigger-like" functions at the two desired limits of operating pressure, and a gas-tight seal is maintained in the closed position at all values of pressure between the minimum and maximum operating limits.

The principal object of my invention is to provide an improved relief valve having a valve disc or closure member arranged so that the pressure column attacks the disc in a direction tending to close rather than to open the orifice.

It is a further object of my invention to provide a relief valve of the type above referred to that will fully and quickly open at a predetermined maximum pressure, and will remain fully open until a predetermined minimum pressure is reached, at which time it will close quickly and tightly.

It is also an object of my invention to provide a valve of the type above referred to having improved adjustment features incorporated therein, whereby the maximum and minimum pressure settings may be made.

It is a still further object of my invention to provide a pressure relief valve having a closure member which opens against a pressure column with an independent buckled diaphragm capable of assuming either of two extreme positions for quickly and fully opening the closure member when the buckled diaphragm is in one of the two extreme positions and being entirely free of the closure member in its other extreme position.

It is still another object of my invention to provide a simple and efficient structural formation of parts comprising a diaphragm actuated tire valve capable of functioning as a sensitive and accurately adjustable pressure relief valve.

It is another object of my invention to provide a relief valve of the type having a closure disc which is spring-pressed against a valve seat and which has an operating means movable independently of said valve and designed to quickly open the valve after a predetermined movement in response to a predetermined applied pressure. The relative movement between said valve disc and said operating means remains substantially constant irrespective of the wear of said disc on said seat, so that the valve will open at the exact predetermined pressure and obviate any tendency of the operating means to slightly lift the valve prior to the predetermined operating pressure.

With the foregoing and other objects in view, the invention consists in the construction, combination and arrangement of parts hereinafter described and illustrated in the drawing, in which:

Fig. 1 is a longitudinal sectional view of a valve illustrating the preferred embodiment of my invention; and Fig. 2 is a longitudinal section showing an enlarged view of a modification of the adjusting screw illustrated in Fig. 1, with means for adjusting the differential of the buckled diaphragm.

In Fig. 1, a machined mounting member 5, of bronze or other suitable material is provided with a hexagonal shoulder 4' and a threaded nipple 5' for attaching the assembly to a standard pipe fitting. The face of the nipple is counterbored and fitted with a filtering screen 19, the fluid to be controlled passing through screen 19 and input port 20 and thence into a cylindrical cavity 21 extending outwardly from a threaded and flanged shoulder 22.

One end of a seamless metallic bellows 18 is sweated or soldered into the groove 23 formed in the shoulder 22 of said mounting member. This bellows surrounds the cylindrical cavity 21 and terminates in a valve supporting disc 3, which is also sweated or soldered in place.

The valve proper, which is designated generally at 4, is threaded into the valve supporting disc 3 and sweated or soldered in place after it has been adjusted to a definite dimension. The valve proper, as shown, is a standard automobile tire valve which is selected because of its proven efficiency, applicable dimensions, and commercial availability; however, I do not wish to be limited to this particular type of valve construction, since obviously similarly constructed valves of different sizes could be used, or a resiliently pressed ball could be substituted for the closure disc in a manner well known in this art. The outer casing of the valve is slightly modified in that the outlet threaded end 10 is shortened by $\frac{1}{16}$ of an inch to expose the valve pin 24, and the extended shank 21' of the valve casing is cut to a smaller diameter to provide a loose fit within the cylindrical cavity 21 of the mounting.

The circular diaphragm seat 1 is provided with four escape orifices, two of which are indicated in Fig. 1 by reference numeral 25. This seat is adapted to be threaded onto the outlet end of the valve proper and secured thereto by means of a set screw 17. A self-restoring type of buckled diaphragm 16 is held against a shoulder 9 of the diaphragm seat 1 by a removable retainer spring 2 in such a manner as to permit the outer diameter of the diaphragm to expand as it passes through dead center.

An adjusting screw 7 has a rounded end designed to match the contour of the buckled diaphragm when the latter is in a position reversed from that shown. This adjusting screw is secured by the lock nut 8 to the outer end of a cylindrical shell 6. The cylindrical shell 6 has a threaded end portion which is threaded onto the flanged shoulder 22 of the mounting member 5. Four slots, two of which are shown in Fig. 1, indicated generally at 12, are provided in the threaded end of shell 6 and which provide a spring-like grip to prevent loosening as a result of vibration. At the opposite end of the shell proper there are also provided four equally spaced holes 14. These holes, together with the said slots at the threaded end, provide outlet ports for internally discharged fluids and intruded rain water regardless of the position in which the bleeder valve may be mounted.

Fig. 2 illustrates a modification of the invention shown in Fig. 1 incorporating features by means of which the differential of the diaphragm may be adjusted.

The adjustable plug 7' (similar to the screw of Fig. 1) is shown in an enlarged view and this plug is provided with a spring loaded plunger 15. The spring 26 is compressed between the plunger 15 and the adjustable plug 27 so that the spring pressure applied to the plunger 15 may be adjusted, so that the spring actuated plunger may exert an adjustable pressure against the diaphragm in order to change its differential. The lock nut 28 is provided to retain the plug 27 in its adjusted position.

Other means of adjustment may be provided within the scope of this invention. For example, the structure shown may be modified to the extent of making the filter screen 19 removable, giving access to an adjusting screw to be added to the inlet port at the base of the valve proper. This screw, may, for example, be provided with a conical point so that its adjustment changes the size of the inlet port to the valve 4.

In operation, it will thus be seen that by applying a fluid to the input orifice under pressure, the column will enter the cylindrical cavity of the mounting member, whence it passes around the valve casing 21' into the space enclosed by bellows 18. The valve being normally closed, the bellows 18 will expand, pushing the entire valve and buckled diaphragm assembly toward the rounded point of the adjusting screw 7. The cylindrical cavity 21 acts as a guide, preventing tilting or other distortion of the bellows and its appended parts, and the pressure column provides a cushion between the valve casing and the inner wall of the cavity, which reduces friction and eliminates chatter. As the expansion of the bellows pushes the edge of the buckled diaphragm 16 forward, the center of the convex surface of the latter contacts with the adjusting screw, and further movement of the bellows causes the diaphragm to be depressed. This depression of the diaphragm continues, without any other change in operating conditions, until the critical position is reached, at which the diaphragm snaps through dead center, assuming a concave shape reversely similar to its normal set. In so doing, the surface of the diaphragm opposite to the adjusting screw collides with and depresses the valve pin, causing the valve to discharge into the chamber behind the diaphragm and thence through the outlet ports which are provided in the side wall of the diaphragm seat and in the outer shell.

So long as this pressure source is maintained constant at the bleeder valve input orifice, the valve proper will continue to discharge. This function of the valve is the result of the fundamental characteristics of the buckled diaphragm, which requires a greater force to snap it through the dead center than it does to retain it in the depressed position. It should be understood that the buckled diaphragm is of the self-restoring type, that is, certain stresses are built into the diaphragm so that the only normal position is that shown in the drawing. In accordance with the laws governing the action of these devices, various differentials between pushover and return pressure can be built into them. For example, in an actual construction a beryllium copper diaphragm having an overall diameter of ⅝ of an inch and a thickness of .008 of an inch, was used. This diaphragm required a pushover pressure of about five and a quarter pounds but had a holding or return pressure of only one and a quarter pounds. It should be understood that these factors while obviously important do not alone control in the determination of the differential characteristics of the complete bleeder valve assembly, as will presently appear from the discussion to follow.

When the pressure at the input orifice falls below a value determined by the differential characteristics of the bleeder valve, the bellows will have contracted to a point where the exerted force on the diaphragm is reduced to its critical value (for the above diaphragm that would be about 1.25 pounds), and the diaphragm will snap back to its normal set. This reverse action releases the valve pin instantaneously, resulting in a complete gas-tight seal which is maintained until the input pressure is again raised to the critical value described above for the opening cycle.

It should be apparent from the foregoing description that the position of the diaphragm relative to the end of the valve pin is critical, that is, the diaphragm if properly adjusted will snap through its dead center position just prior to engaging the valve pin to open the valve; similarly, the diaphragm must snap through the dead center position before the valve closes. In actual construction this adjustment is made as follows: The outer cylindrical casing 6 is removed and a gas pressure of about 10 pounds per square inch is applied to the inlet port 20, the position of the diaphragm seat 1 with respect to valve pin 24 is adjusted and locked at that point where no opening of the valve results from depressing the buckled diaphragm until after the latter snaps through dead center, and conversely, the valve proper continues to discharge throughout that portion of the return stroke of the diaphragm which precedes the snap through dead center to its normal set. The adjustment is critical and must be carefully made.

It is apparent that the metallic bellows 18 has a natural spring action, and requires a certain increment in applied pressure to produce a given elongation. The construction of the bellows is therefore an important factor to be considered along with the characteristics of the diaphragm in designing a valve adapted to operate over a certain pressure range.

The structure shown in Fig. 1 of the drawing is capable of being adjusted through a wide operating range, either with respect to the opening or closing pressure; but the differential between the two limits will be essentially constant. Thus, a model constructed in accordance with the details shown in Fig. 1, referred to above, may be adjusted to operate at any desired pressure within the range of 7 to 35 pounds per square inch. When adjusted to open at 20 pounds per square inch the operating characteristics for this particular assembly of selected components resulted in its closing when the applied pressure was reduced to 14 pounds. When adjusted to open at 1 pounds per square inch, it closed when the pressure was dropped below 1 pound per square inch, and when adjusted to open at 35 pounds per square inch it closed when the pressure was reduced below 29 pounds. Conversely, when it was adjusted to close at a definite desired pressure, say, 10 pounds per square inch, it opened when the pressure was raised to 16 pounds. This fixed differential characteristic can also be controlled over relatively wide limits, but only by modification of the inherent characteristics of certain components comprising an assembly of the structure as shown.

The factors effecting the operating differential are mainly: the diameter and stiffness of the bellows 18; the diameter, thickness and set of the buckled diaphragm 16; the ratio between the size of the escape ports provided from the valve proper and from the chamber behind the buckled diaphragm; the ratio between the diameter of the closure disc of the valve 4 and the effective diameter of the bellows 18; and the ratio between the sizes of the inlet passages provided to the valve proper and to the bellows. Bleeder valves of the structure shown can, therefore, be assembled from various selected components to provide any desired valve of "fixed differential" characteristics. Likewise, by proper selection of components, the structure shown may be adapted for operation at any reasonable desired maximum pressure limit.

Other modifications and changes in the number and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. In a pressure relief valve, the combination including an outer cylindrical casing, a longitudinally movable member within said casing, inlet means for introducing pressure to the interior of said casing and against the longitudinally movable member whereby the said member will move longitudinally of the casing in response to an increase in the applied pressure, a valve assembly comprising a body member having a valve seat formed therein and a spring influenced closure disc covering said seat, said body member being carried by said longitudinally movable member extending into the interior thereof so that the pressure applied to the longitudinally movable member is also applied to the closure disc in a direction tending to keep the valve closed, the closure disc having an operating stem projecting beyond the end of said body member, a self-restoring over dead center actuating means positioned adjacent the projecting valve stem, said actuating means being carried by said body member and biased to a normal position free from mechanical connection with said stem, an operator positioned in the path of movement of said actuating means for moving said actuating means through its dead center position into engagement with the projecting end of said operating stem to cause said valve to open suddenly and fully for relieving the pressure after said longitudinally movable member, valve assembly, and the last named means have all moved together a predetermined distance in response to a sudden or gradual increase in pressure, and to close suddenly and tightly after relieving such pressure.

2. In a pressure relief valve a casing having an outlet port, a mounting member with an inlet port secured to said casing, an expansible means secured to said member so as to form a fluid tight chamber therewith, a valve carried by said expansible means and extending into said chamber, said valve having a spring pressed closure member arranged in said chamber so that the pressure therein acts upon said closure member in a direction tending to keep the valve closed, an operating stem extending from said closure member outside said chamber, a snap operating means for said valve comprising a diaphragm supporting member, a buckled diaphragm therein, and a plug adjustable in the end of said casing adapted to engage the buckled diaphragm to move same through its dead center position wherein it collides with and depresses the valve stem opening said valve when the expansible means has moved the buckled diaphragm a predetermined distance in response to a predetermined applied pressure.

3. In a pressure relief valve the combination including a casing having an outlet port, a mounting member having an inlet port secured to said casing, a fluid tight expansible means carried by said member so as to be movable longitudinally of said casing upon an increase in applied pressure at said inlet port, a valve carried by said means and movable therewith, a snap actuated valve operating means movable with said valve comprising a diaphragm supporting member, a buckled diaphragm supported by said member so as to be movable through its dead center position, an adjustable plug at the end of said casing which engages the diaphragm to move same through its dead center position to actuate the valve when the expansible means has moved a predetermined distance in response to a predetermined applied pressure.

4. The invention defined in claim 3 wherein the first named means comprises a metallic bellows.

5. In a pressure relief valve the combination including an outer cylindrical casing having inlet and outlet ports, fluid tight pressure responsive means within said casing and subject to the pressure at said inlet and said outlet, said means being movable relative to the casing a predetermined distance in response to a predetermined increase or decrease in pressure differential between said inlet and said outlet, a valve assembly sealed within said means and movable therewith for relieving the pressure applied thereto when it exceeds a predetermined value, an escape orifice and spring pressed closure disc within said valve assembly, said closure disc being positioned on the inlet side of said means so that the pressure applied at said inlet is also applied to the closure disc, tending to keep the valve closed, an independent snap actuating means for effecting the operation of said closure disc movable with said valve assembly and first named means to cause said escape orifice to open suddenly and fully after said valve assembly, together with the first and last named means, have moved a predetermined distance in response to the application of a predetermined pressure of a magnitude equivalent to the pressure setting of said valve, and to close suddenly and tightly after said pressure has been reduced a predetermined amount.

6. In a fluid pressure relief valve, the combination including a casing having inlet and outlet ports, a fluid-tight pressure responsive means movable within said casing and subject to the pressure differential between said inlet and outlet ports, said means having a normally closed valve formed therein for controlling the escape of fluid from said inlet to said outlet, a self-restoring over dead center actuating device carried by said first named means free from mechanical connection with said valve for opening said valve at a predetermined pressure, and for closing said valve at a lower predetermined pressure and adjustable means for changing the pressure at which said valve will operate at the same time maintaining a substantially constant differential between said predetermined pressures.

7. The invention defined by claim 6 further characterized by the addition of separate means whereby said pressure differential may be changed.

8. In a pressure relief valve, the combination including a casing having inlet and outlet ports, a pressure responsive means positioned therebetween movable longitudinally of said casing, a valve formed therein, a snap actuated operating means for said valve movable therewith comprising a self-restoring buckled diaphragm having a pressure differential whereby a greater pressure is required to move the diaphragm from its normal buckled position through dead center to its unstable buckled position than is required to retain it in its unstable buckled position, and means for adjusting the pressure differential at which said diaphragm will operate.

9. The invention as defined in claim 8 wherein said adjusting means comprising an adjustable plug for actuating the diaphragm in response to a predetermined pressure causing said diaphragm to move a predetermined distance against said plug, said plug having an adjustable spring pressed plunger member therein, whereby the pressure applied to the diaphragm may be adjusted.

10. In a pressure relief valve the combination including an outer cylindrical casing having an outlet port therein, a mounting member having an inlet port, an elongated cylindrical shoulder formed about said port integral with said member and extending laterally therefrom so as to form a cavity communicating with said port, a fluid tight expandable pressure responsive means secured to said member, a valve carried by said means having an outer cylindrical casing extending into the cylindrical cavity formed by said shoulder providing a loose fit therein and forming a cushioned guide for said fluid tight expandable pressure means when the casing and member are assembled and the inlet port subjected to an increasing applied pressure, said mounting member having an externally threaded shoulder, an undersized internal thread cut in one end of the cylindrical casing, and a plurality of longitudinal slots formed in said casing at an end thereof to provide a spring like grip to said casing and member when threaded together to prevent loosening as a result of vibration.

11. In a fluid pressure relief valve the combination including a casing having inlet and outlet ports, a fluid tight movable pressure responsive means positioned within the casing so that one side thereof is subjected to the fluid pressure at the inlet while the other side is subjected to the fluid pressure at the outlet, a valve seat carried by said means and a spring pressed closure member therefor for controlling the flow of fluid from said inlet to said outlet, a valve operating means having a freedom of movement with respect to said valve closure member and means for adjusting the position of said valve operating means relative to said closure member, said valve operating means being movable in response to the critical movement of said pressure responsive means to cause the valve to open quickly and fully for relieving a predetermined excess pressure, and to close suddenly and tightly after relieving such excess pressure.

12. In a pressure relief valve comprising a casing having inlet and outlet ports, a pressure responsive means movable in response to an increase or decrease in the applied pressure, a valve formed in said means and carried thereby, an operating means for said valve free from connection therewith comprising an over dead center actuating device having a portion movable to open said valve at a predetermined applied pressure, said movable portion having a delay action incorporated therein whereby upon a fixed decrease in the applied pressure the movable portion will take a position allowing said valve to close.

13. In a snap-acting fluid pressure relief valve, the combination including a casing having inlet and outlet ports, a valve structure comprising a valve seat, a spring-pressed valve disc normally closing said seat positioned between said inlet and outlet ports so that the pressure at the inlet port is applied directly to said disc in a direction tending to maintain the said disc firmly against said seat, a valve operating means having freedom of movement with respect to said valve disc positioned on the outlet side of said valve seat so as to be unaffected by the high pressure at the inlet port when said valve disc closes said seat, means responsive to an increase in pressure above a predetermined value whereby said disc is quickly moved off its seat by said operating means, means partially confining the inlet pressure to one side of said operating means when said valve disc is moved off its seat so that said inlet pressure will act against said operating means in a direction tending to effect its movement allowing said valve to close, said partially confining means also constituting meanss for obtaining a reduced pressure and said casing providing means for partially confining said reduced pressure to the opposite side of said valve operating means whereby said reduced pressure will act against said operating means in a direction tending to maintain said operating means in a position causing said valve disc to remain off said valve seat.

14. In a pressure relief valve, the combination of a main casing, an expansion chamber arranged therein, means including a passage extending through said casing and communicating with said chamber providing an inlet for said valve, a valve having a closure member and a seat therefor carried by the end wall of said expansion chamber and extending into said passage so that the pressure on said chamber is applied directly to the closure member in a direction tending to force same against its seat to keep the valve closed, means carried by said end wall independent of said closure member, movable with respect to said end wall, and cooperating with said closure member near the limit of its movement to cause the valve to open suddenly and fully for relieving pressure and to close suddenly and tightly after relieving such pressure, and means adjustable in the end of said main casing to change the pressure at which said valve operating means is actuated.

15. In a pressure relief valve comprising a casing having inlet and outlet ports, a pressure responsive means in said casing positioned between said ports and movable in response to an increase or decrease in the applied pressure, a valve formed in said means having a valve stem extending outwardly therefrom and movable therewith, operating means for said valve comprising a snap acting self-restoring buckled diaphragm spaced from said valve stem so that in its normal stable shape said valve remains closed and constructed so that a greater pressure is required to deflect the diaphragm from its stable shape through dead center into engagement with said stem than is required to retain it in its unstable buckled position, whereby the valve will open at a certain predetermined applied pressure and will close only after the applied pressure has decreased a fixed amount.

16. In a snap acting pressure relief valve, the combination including a casing having inlet and outlet ports, a fluid tight pressure responsive means positioned therebetween, a valve formed in said means having a spring pressed closure disc positioned between said inlet and outlet port, so that the pressure at the inlet port is applied directly to said closure disc in a direction tending to maintain the valve closed, a valve operating means positioned on the outlet side of said valve and operable independently thereof, so that as the applied pressure is increased the pressure on the closure disc is also increased until a critical pressure is obtained, at which pressure the operating means will fully open said valve with a snap action.

17. In a pressure relief valve the combination including a casing having inlet and outlet ports, a normally closed valve positioned in said casing for controlling the flow of fluid from said inlet to said outlet, said valve having a spring pressed closure disc and a valve plunger extending therefrom so arranged that pressure at said inlet is applied directly to said valve in a direction tending to maintain the valve closed, means for opening said valve in response to a predetermined fluid pressure applied at said inlet which acts upon the valve disc tending to maintain said disc closed, said means comprising an independent buckled diaphragm capable of assuming either of two extreme positions, the diaphragm being positioned adjacent the valve plunger so that in one extreme position the diaphragm contacts the plunger to fully open the closure disc against the applied pressure, while in the other extreme position the diaphragm is entirely free of the closure member and the plunger.

18. In a pressure relief valve the combination including a casing having inlet and outlet ports, a normally closed valve positioned in said casing for controlling the flow of fluid from said inlet to said outlet, said valve having a spring pressed closure disc and a valve plunger extending therefrom so arranged that pressure at said inlet is applied directly to said valve in a direction tending to maintain the valve closed, means for opening said valve in response to a predetermined applied pressure, said means comprising an independent buckled diaphragm capable of assuming either of two extreme positions, the diaphragm being positioned adjacent the valve plunger so that in one extreme position the diaphragm contacts the plunger to fully open the closure disc against the applied pressure, while in the other extreme position the diaphragm is entirely free of the closure member and the plunger, and means for adjusting the position of the diaphragm relative to said valve so that no opening of the valve results from depressing the buckled diaphragm until after the latter snaps through dead center, and so that the valve will remain open during that portion of the return stroke which precedes the snap through dead center in order that the valve may seat and open with a snap.

19. In a fluid pressure relief valve, the combination of a casing for housing a pressure responsive expandable element and an energy storing snap-acting device; a valve seat in said casing; a spring-pressed normally closed valve disc covering said seat having an operating stem projecting therefrom and normally spaced from said snap-acting device; a stud abutment supported by said casing, and means whereby the operation of the expandable element, in response to a predetermined applied pressure will move the snap-acting device into engagement with said abutment to effect the operation of said snap-actuating device to cause said device to impinge against said operating stem causing a maximum and instantaneous opening of said valve disc, said energy storing snap-acting device maintaining the valve in an open condition until the applied pressure is reduced by a predetermined differential value whereby the operation of each of the main elements will be reversed in the same sequence defined above and only as a direct result of the operation of the preceding element to instantaneously and completely close the valve.

20. The invention defined by claim 19, further characterized by the addition of separate adjusting means whereby the action initiated by the operation of the pressure responsive expandable element may be controlled to cause the valve member to open throughout a wide range of predetermined values of applied pressure.

21. The invention as defined in claim 19 further characterized by the addition of separate adjusting means whereby the initiation of the sequence of operations responsive to the reduction of the applied pressure may be controlled to cause the relief valve to close over a relatively wide range of predetermined values of pressure differential.

22. A fluid pressure relief valve comprising, in combination, a casing having inlet and outlet ports, a fluid-tight pressure responsive member carrying a valve assembly positioned within said casing so that opposite sides thereof are respectively subjected to the pressure at said inlet and said outlet, said member being normally retained in a position from which it is yieldably movable a predetermined amount in one direction in response to a predetermined increment in fluid pressure at said inlet; said member moving in the opposite direction in response to a decrement in pressure at said inlet; said valve assembly including a seat, a closure disc covering said seat for controlling the flow of fluid from said inlet to said outlet, said disc being positioned on the inlet side of said member so that the fluid pressure at said inlet will be applied directly to said disc in a direction tending to maintain the valve closed, and a stem for operating said valve extending through the opening formed by said seat to the outlet side of said member; a self-restoring snap actuated means positioned on the outlet side of said member, said means being normally biased to a position from which it is movable in a direction opposite the movement of said member to impinge against said stem in response to a predetermined increment in pressure at said inlet and an operator for moving said snap actuating means in said direction when said operator and snap actuating means are pressed against each other by the predetermined movement of said pressure responsive member in response to the predetermined increment in pressure at said inlet, whereby said valve will open suddenly and fully for relieving said pressure and will close suddenly and tightly after relieving said pressure.

23. A pressure relief valve comprising, in combination, a casing having inlet and outlet ports, a pressure responsive means movable within the casing in response to an increase in applied pressure, a valve assembly sealed within said means and movable therewith including an escape orifice and spring pressed closure disc having an operating stem projecting therefrom, an over dead center actuating device, said device being biased in a direction normally away from said valve stem but movable to a position effecting engagement therewith for operation thereof, and an operating device for moving said over dead center actuating device through its dead center position, one of said devices being carried by said first named means, the other of said devices being positioned in the path of movement of said first named means so that upon said predetermined increase in applied pressure the operating device will press against the snap-actuating device to move the latter through its dead center position.

24. A pressure relief valve comprising, in combination, a cylindrical casing having inlet and outlet ports, a pressure responsive means movable longitudinally within the casing on an increase in pressure applied at said inlet, said means having a valve assembly formed therein comprising a seat, a disc covering said seat having an operating stem; a self-restoring over dead center snap-actuating device carried by said means and mounted adjacent said operating stem free from mechanical linkage connection therewith and biased in a direction normally away from said stem, a stop member carried by said casing and mounted in the path of movement of said means for operating said snap-actuating device, whereby upon critical movement of said means in response to a predetermined increase in pressure applied at said inlet said over dead center device will be pressed against the stop member to cause said over dead center device to move through its dead center position into a position effecting engagement with said stem to open said valve fully and quickly for relieving said pressure.

EDWIN L. POWELL.